J. F. SCHILLER.
PACKING FOR PUMP PLUNGERS.
APPLICATION FILED MAY 25, 1911.
1,010,691.
Patented Dec. 5, 1911.
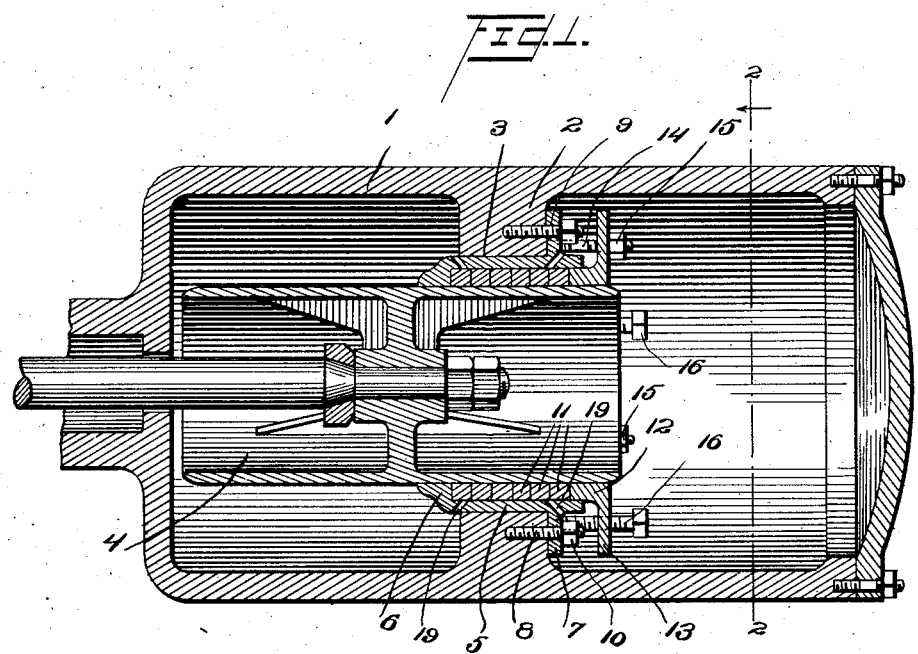
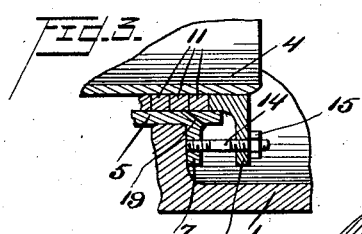
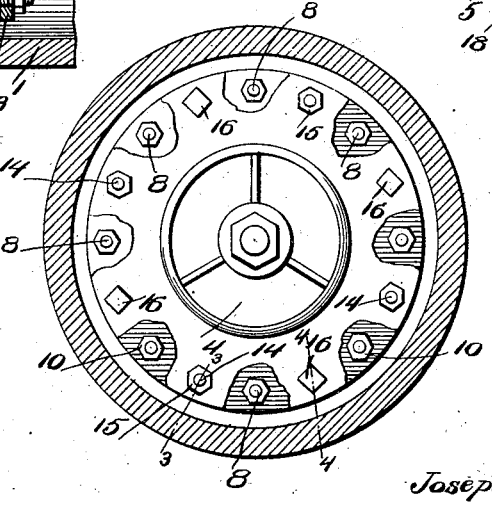
Witnesses
W. Strauss
R. H. Krenkel.
Inventor
Joseph F. Schiller
By Joshua R. H. Potts.
Attorney

UNITED STATES PATENT OFFICE.

JOSEPH F. SCHILLER, OF PHILADELPHIA, PENNSYLVANIA.

PACKING FOR PUMP-PLUNGERS.

1,010,691.  Specification of Letters Patent.  Patented Dec. 5, 1911.

Application filed May 25, 1911. Serial No. 629,280.

*To all whom it may concern:*

Be it known that I, JOSEPH F. SCHILLER, a citizen of the United States, residing at Philadelphia, in the county of Philadelphia and State of Pennsylvania, have invented certain new and useful Improvements in Packings for Pump-Plungers, of which the following is a specification.

My invention relates to improvements in packings for pump plungers, the object of the invention being to provide an improved stuffing box which is adapted to be located in the opening of the pump partition, and capable of adjustment, so as to insure a tight juncture between the packing and the plunger.

A further object is to provide a packing of this character which is adapted for use with any ordinary pump of that type in which a plunger moves through a partition between enlarged chambers, and which improved packing may be installed on old pumps as well as on new ones.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating my improvements. Fig. 2, is a view in section on the line 2—2 of Fig. 1. Fig. 3, is a fragmentary view in longitudinal section illustrating one of the bolts 14. Fig. 4, is a similar view illustrating one of the screws 16.

1, represents a cylinder which is divided by a partition 2 having a central opening 3 therein through which a reciprocating plunger 4 is adapted to move. It is to be understood that the cylinder 1 is designed to illustrate any ordinary type of cylinder having any suitable arrangement of valves (not shown) to compel the suction and discharge of water from the chambers at both sides of partition 2, as is common with pumps of this type.

Located in the opening 3 in partition 2, is my improved stuffing box 5 which is of an appreciably greater length than the thickness of said partition, and is provided at one end with an inwardly projecting annular flange 6, and at its other end with an outwardly projecting annular flange 7, the latter bearing against partition 2, and secured in such position by means of bolts 8, screwed into the partition, projecting through openings 9 in the flange 7, and upon which nuts 10 are located and screwed against flange 7 to securely hold the stuffing box in place.

In the stuffing box 5, a series of packing rings 11 are located, and are clamped between the internal flange 6 at one end of the box, and the gland 12 at the other end of the box. Gland 12 is made at its outer end with an annular flange 13, and the latter is provided with two circular series of openings. One of these circular series of openings is adapted to receive bolts 14, which are secured in flange 7, and nuts 15 are screwed onto these bolts 14, against the flange 13 to move the gland inwardly against the packing. Through the other series of openings above referred to, jam screws 16 are projected. This last series of openings is screw-threaded so that the ends of said jam screws which are preferably made with lugs 17 to center in sockets 18, and flange 7 serves to bind the gland against movement when said jam screws are turned after the gland is once adjusted by means of nuts 15.

Packing rings 11 may be fibrous or of metal, and box 5, adjacent its ends in the respective chambers of the cylinder, is made with perforations 19, so as to allow the water in the respective chambers to come into contact with the back of the packing ring, so as to equalize the pressure, holding the packing rings against the plunger without the necessity of screwing the gland far enough into the box to cause the loss of power due to the excessive power necessary to reciprocate the plunger when the packing is very tight. In other words, by reason of the several bolts, nuts, and screws above described, the packing may be properly adjusted so as to make the partition tight, yet not unduly bind the plunger and the pressure on the water is transmitted to the back of the packing rings or at least some of them, to produce the best results.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A stuffing box of the character described adapted to fit an opening in a partition, an internal flange on one end of said box, an external flange adjacent the other end of said box having openings therein, a gland positioned in the end of said box, a flange on said gland, three independent sets of bolts, one set adapted to be secured in the partition and projected through the openings in the flange of the box, a second set screwed into openings in the flange of the box, and projected through openings in the flange of the gland, the third set located in threaded openings in the gland, and bearing against the flange of the box, heads on said last-mentioned bolts, and nuts on the other of said bolts, substantially as described.

2. A stuffing box of the character described, adapted to fit the opening in a partition, an internal flange on one end of said box, an external flange adjacent the other end of said box having openings therein, said flange adapted to be positioned against the partition, bolts adapted to be secured in the partition and projected through said openings in the flange, nuts on said bolts against the flange to bind it against the partition, outwardly projecting bolts secured in said flange, a gland, a flange on said gland having openings receiving said outwardly projecting bolts, nuts on said last-mentioned bolts against said gland, and packing rings in said box between the gland and the internal flange, said flange on the gland having a series of screw-threaded openings, and jam screws located in said screw-threaded openings and bearing at their inner ends against the annular external flange on the box, substantially as described.

3. A stuffing box of the character described, adapted to fit the opening in a partition, an internal flange on one end of said box, an external flange adjacent the other end of said box having openings therein, said flange adapted to be positioned against the partition, bolts adapted to be secured in the partition and projected through said openings in the flange, nuts on said bolts against the flange to bind it against the partition, outwardly projecting bolts secured in said flange, a gland, a flange on said gland having openings receiving said outwardly projecting bolts, nuts on said last-mentioned bolts against said gland, packing rings in said box between the gland and the internal flange, said box having openings therein adjacent the ends of the box, said openings adapted to be located at opposite sides of the partition, whereby the fluid pressure in the respective chambers is equalized against the back of the packing in the box, substantially as described.

4. A stuffing box of the character described, adapted to fit the opening in a partition, an internal flange on one end of said box, an external flange adjacent the other end of said box having openings therein, said flange adapted to be positioned against the partition, bolts adapted to be secured in the partition and projected through said openings in the flange, nuts on said bolts against the flange to bind it against the partition, outwardly projecting bolts secured in said flange, a gland, a flange on said gland having openings receiving said outwardly projecting bolts, nuts on said last-mentioned bolts against said gland, and packing rings in said box between the gland and the internal flange, said flange on the gland having a series of screw-threaded openings, and jam screws located in said screw-threaded openings and bearing at their inner ends against the annular external flange on the box, said box having openings therein adjacent the ends of the box, said openings adapted to be located at opposite sides of the partition, whereby the fluid pressure in the respective chambers is equalized against the back of the packing in the box, substantially as described.

In testimony whereof I have signed my name to this specification in the presence of two subscribing witnesses.

JOSEPH F. SCHILLER.

Witnesses:
R. H. KRENKEL,
CHAS. E. POTTS.